United States Patent [19]

Brand et al.

[11] Patent Number: 4,814,146

[45] Date of Patent: Mar. 21, 1989

[54] DEVICE FOR THE CONTAINMENT OF MONOLITHIC CATALYSTS

[75] Inventors: Reinhold Brand, Moembris; Bernd Engler, Hanau; Peter Kleine-Moellhoff; Edgar Koberstein, both of Alzenau, all of Fed. Rep. of Germany

[73] Assignee: Degussa Aktiengesellschaft, Frankfurt/Main, Fed. Rep. of Germany

[21] Appl. No.: 18,247

[22] Filed: Feb. 24, 1987

[30] Foreign Application Priority Data

Mar. 1, 1986 [DE] Fed. Rep. of Germany ... 8605649[U]

[51] Int. Cl.⁴ .............................................. B01J 32/00
[52] U.S. Cl. ..................................... 422/179; 422/171; 422/180; 422/221; 422/222; 55/483; 55/484; 55/502
[58] Field of Search ............... 422/179, 180, 196, 221, 422/222, 171, 175; 55/483, 484, 502, 350, 507, 509, 511

[56] References Cited

U.S. PATENT DOCUMENTS

| | | |
|---|---|---|
| 1,426,196 | 8/1922 | Jordahl .................................. 55/483 |
| 3,487,625 | 1/1970 | Lucas ..................................... 55/484 |
| 3,721,067 | 3/1973 | Agnew ................................... 55/350 |
| 4,048,363 | 9/1977 | Langer et al. ....................... 422/179 |
| 4,294,806 | 10/1981 | Abe et al. ............................ 422/170 |
| 4,324,701 | 4/1982 | Honda et al. ....................... 422/180 |
| 4,335,023 | 6/1982 | Dettling et al. .................... 422/180 |
| 4,416,675 | 11/1983 | Montierth ........................... 422/180 |
| 4,419,108 | 12/1983 | Frost et al. ......................... 422/180 |
| 4,580,381 | 4/1986 | Sodel et al. ......................... 55/484 |
| 4,636,232 | 1/1987 | McDowell ............................ 55/502 |
| 4,663,934 | 5/1987 | Sickels ................................ 422/179 |

FOREIGN PATENT DOCUMENTS 343762 2/1960 Switzerland ........................... 55/483

*Primary Examiner*—Barry S. Richman
*Assistant Examiner*—Jill Johnston
*Attorney, Agent, or Firm*—Beveridge, DeGrandi & Weilacher

[57] ABSTRACT

A device for the containment of ceramic catalyst monoliths particularly of four cornered cross sectional area as well as for the combination of a plurality thereof into a package. The device includes elastic gaskets arranged on one of the ends of the monoliths and partitions for the form fitting containment of the elements into a cassette.

6 Claims, 1 Drawing Sheet

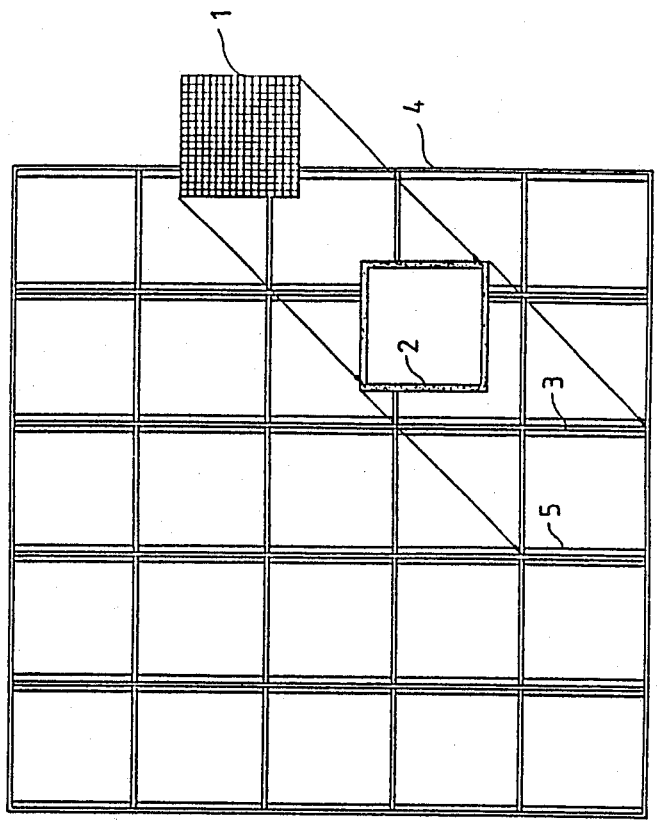
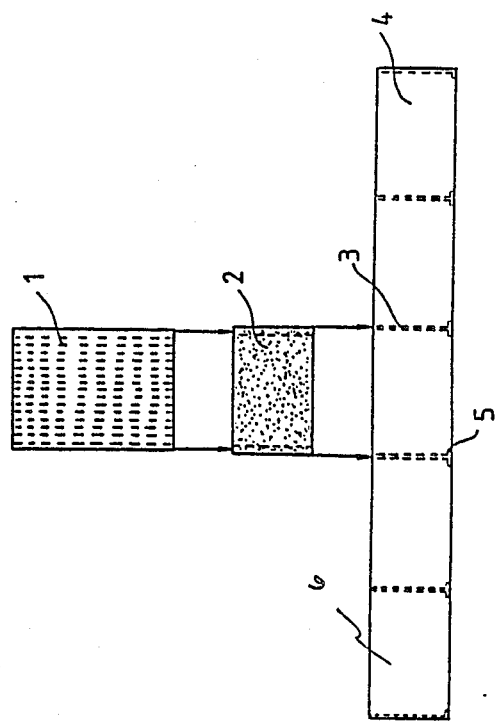

DEVICE FOR THE CONTAINMENT OF MONOLITHIC CATALYSTS

BACKGROUND OF THE INVENTION

The present invention concerns a device for the containment of four cornered, for example, square or rectangular, monolithic ceramic catalyst elements which elements are used in the prevention of emission of harmful substances from combustion installations, for example, furnace equipment for heat power plants. In addition, the present invention relates to a device that can be used for the combination of such catalyst elements into a package or array.

Ceramic monoliths used for the fabrication of catalytic elements require a safe and shock absorbing containment apparatus because of the risk of breakage under extreme operating conditions such as physical shocks, pressure surges, temperature fluctuation and the like. Such catalytic elements cannot always be produced in the size required for a desired end use and therefore, the need exists to combine several elements or a plurality thereof in an array or series in order to provide the necessary catalytic surface to treat the large volumes of gas flowing per time unit, for example, in the case of exhaust gases of large power plants.

SUMMARY OF THE INVENTION

According to the present invention, there is provided a device for the containment of quadrilateral, monolithic ceramic catalyst elements for the aftertreatment of exhaust gases obtained from combustion installations and a device for the combination of a plurality of such elements into an array, cassette or package.

BRIEF DESCRIPTION OF THE DRAWINGS

The present invention will be further understood by reference to the accompanying drawings, wherein:

FIG. 1 shows a partial elevational plan view of the configuration of the present invention, and FIG. 2 shows a top plan view with an isometric projection of a cross section of said gasket means and said catalytic element.

DESCRIPTION OF THE PREFERRED EMBODIMENT

A preferred embodiment of the present invention includes an elastic buffer gasekt (2) having a shape generally corresponding to the outside shape of the catalyst element (1) and capable of being slipped onto the element and conforming to the contour of the element in a form fitting manner. The preferred embodiment also includes a metal cassette (4) having a plurality of vertical partitions (3) for dividing the cassette into a plurality of equal sized compartments conforming generally to the outside shape of the combination of the catalyst element and the buffer gasket and capable of accommodating the catalyst element and gasket. The partitions are open on the upper side so as to accommodate the element and gasket. The inside free cross sectional area of each compartment is greater than the front surface areas of the catalyst element and smaller than the sum of the front surface area of the catalyst element and the buffer gasket, or equal to the sum of these front surface areas.

Additionally, the depth or dimension of the cassette and height of the buffer gasket correspond to at least 1/5 of the length of the catalyst element.

The buffer gasket can be formed, for example, of mineral fiber, ceramic fiber, wire mesh or other high temperature resistant elastic working materials. After it had been slipped onto and fitted over the front end of the monolith, the monolith having the gasket fitted thereon is inserted from above into a free compartment of the metal cassette, as a result of which insertion the elastic gasket may be compressed around the end of the monolith. This compression of the gasket may also be achieved or strengthened by a gasket material which expands when it is heated. Such a material is for example a so-called thermo-expandable mica mat as it is distributed for example by the firm 3M under the designation of INTERAM ®. The required heat treatment may be accomplished after the mounting; however, it can also be carried out in the operation of the purification system by action of hot gases, for example, a hot flue gas in contact with the gasket material thereby causing it to swell. In this manner, all compartments of the metal cassette will provide a snug fit for the monolithic catalyst elements.

Whenever the catalyst is to be exposed to operational conditions such that the frictionally engaged connection between monolith and buffer gasket on the one hand and buffer gasket and intermediate partitions of the cassette on the other hand cannot provide adequate containment of the catalyst element therein, then according to a preferred form of the invention, each compartment of the metal cassette has additionally formed flanges (5) which are attached to a vertical partition (3) or the outer frame structure of the rectangular metal cassette. The flanges extend inwardly into the compartments thus providing a stopping or retaining surface for holding the catalyst element in a compartment. The flanges (5) can extend perpendicularly with respect to the partition wall (3) as a retaining border around the entire frontal circumference of the catalyst element, or flanges (5) can extend at least from two opposite partition walls (3), as shown, to hold or retain the front surface of the catalyst element along a margin or border of the element. An axial shifting of the catalyst element is thereby prevented by the flanges (5).

According to one embodiment of the invention, the flanges (5) can be divided into several "tongues" attached to the partition wall opposite of one another, for example, at the lower front side of the compartments of the cassette, and the tongues project perpendicularly to the inside to thereby form means for holding the front surface of the catalyst element.

The present invention will be explained in greater detail further herein below.

In accordance with FIG. 1, the present invention resides in a device formed of, for example, a 20 cm long monolithic ceramic catalyst element (1) of square cross section (length of edges 150 mm), wbhich element over its entire length consists of a multiplicity of parallel square flow channels in which the waste gas to be treated flows and comes into contact with the catalyst. The ceramic element itself can be constructed from material that is catalytic per se, that is, a substance capable for providing the proper catalysis behavior. Alternatively, the element can be formed of an inert ceramic which has deposited thereon a coating of catalytically active material. Such monolithic elements and the catalytic coatings as well are known in the art.

A 10 cm long buffer gasket (2) made of elastic wire mesh with slightly smaller free inside cross sectional area (149 cm×149 cm) than the front surface of the monolith (1) is stretched over and forced onto the front end of the monolith (1) in such a way that the outside front surface (lowermost surface in FIG. 1) terminates flush with the front surface of the monolith.

A 10 cm deep metal cassette (4) made of high temperature resistant steel (for example a steel indicated by the commercial designation "V2A") having intermediate partitions (3) has a plurality of equal size compartments (6) which corresponds in general to the outside shape of monolith and gasket and have a somewhat smaller inside free cross section area than the sum of the front surface areas of catalyst element (1) and buffer gasket (2) (158 mm×158 mm).

FIG. 2 shows the element (1) in cross section illustrating the square shaped parallel flow channels. At the lower edge of the opposite partition walls (3) in each compartment, there is provided flanges (5) perpendicular to the partition wall (3), projecting a small distance; e.g. 6 mm, to the inside of the compartment (6) and being capable of retaining and supporting the monolith front surface along the margin or border zone thereof.

In mounting the catalyst elements into the cassette, each monolithic element is fitted with a buffer gasket and then positioned into a vacant compartment of the metal cassette until a flange (5) comes into contact with the monolith front surface.

Further variations and modifications of the invention will be apparent to those skilled in the art and are intended to be encompassed by the claims appended hereto.

We claim:

1. An apparatus for the containment of a plurality of monolithic ceramic catalyst elements of four cornered cross section comprising:
   (a) an elastic buffer gasket (2) generally corresponding, in a form fitting manner, to the outside shape of any catalyst element to be contained by said apparatus,
   (b) a metal cassette frame (4) including a forward and a rearward edge, said metal cassette having a plurality of vertical partition walls and a plurality of intermediate partitions (3) which divide the cassette into a plurality of compartments for the containment of a plurality of monolithic ceramic catalyst elements with each compartment generally corresponding to the outside shape of the buffer gasket and any catalyst element to be contained by said apparatus, and the inside, free cross sectional area of each compartment being larger than the front surface area of any catalyst element to be contained by said apparatus and smaller than or equal to the sum of the front surface area of any catalyst element to be contained by said apparatus and the front surface of the buffer gasket, and
   (c) the minimum distance between the forward and rearward edge of said cassette frame is at least 1/5 of the length of any catalyst element to be contained by said apparatus.

2. The apparatus according to claim 1, wherein at least two of said plurality of vertical partition walls of the metal cassette include flanges (5) on the rearward edge thereof, said flanges each having a surface that extends perpendicularly to each side of said vertical partition walls (3) of a distance at least sufficient to prevent any catalyst element to be contained by said apparatus from movement past the rearward edge of said metal cassette frame.

3. An apparatus for the containment of a plurality of monolithic catalyst elements, comprising:
   a rectangular frame structure having four planar interior surfaces and a forward and a rearward edge;
   a plurality of vertical partitions extending between, and secured to, two of the four planar interior surfaces,
   a plurality of intermediate partitions, some of which extend transversely between and are secured to adjacent vertical partitions, the rest of which extend transversely between and are secured to an interior surface of said rectangular frame structure and an adjacent vertical partition, such that a plurality of essentially equal sized rectangular compartments are formed;
   a plurality of rectangular elastic gaskets having an interior and an exterior planar surface, the exterior surface of said gaskets having a cross-sectional area essentially equal to the internal cross-sectional area of each of said compartments;
   a plurality of elongated catalyst members each having one end positioned within a respective one of said compartments, said catalyst members each having essentially rectangular cross-sections and an exterior cross-sectional area that is less than the internal cross-sectional area of each of said compartments and greater than or equal to the cross-sectional area of the interior planar surface of each of said gaskets.

4. The apparatus according to claim 3 wherein each of said elongated catalyst members has a length which is about five times the minimum distance between the forward and rearward edge of said rectangular frame structure.

5. The apparatus according to claim 3 wherein a plurality of flange members are secured transversely to a rearward edge of each of said vertical partitions such that said flanges extend on opposite sides of the vertical partitions.

6. The apparatus according to claim 5 wherein flanges are formed on the rearward edge of said rectangular frame structure.

* * * * *